(12) United States Patent
Wollard

(10) Patent No.: US 11,493,137 B1
(45) Date of Patent: Nov. 8, 2022

(54) MONOPLANAR IRIS DIAPHRAGM

(71) Applicant: FLATLINE TECHNOLOGIES, LLC, Brookshire, TX (US)

(72) Inventor: Robert Christian Wollard, Brookshire, TX (US)

(73) Assignee: FLATLINE TECHNOLOGIES, LLC, Brookshire, TX (US)

( * ) Notice: Subject to any disclaimer, the term of this patent is extended or adjusted under 35 U.S.C. 154(b) by 0 days.

(21) Appl. No.: 17/477,365

(22) Filed: Sep. 16, 2021

Related U.S. Application Data

(63) Continuation-in-part of application No. 16/527,403, filed on Jul. 31, 2019, now abandoned.

(51) Int. Cl.
*F16K 3/03* (2006.01)
*F16K 3/316* (2006.01)

(52) U.S. Cl.
CPC ............... *F16K 3/03* (2013.01); *F16K 3/316* (2013.01)

(58) Field of Classification Search
CPC .................................. F16K 3/03; F16K 3/316
USPC ....................................................... 251/212
See application file for complete search history.

(56) References Cited

U.S. PATENT DOCUMENTS

| | | | | | |
|---|---|---|---|---|---|
| 2,307,273 | A | ‡ | 1/1943 | Hughes ............... | G05D 7/0173 251/212 |
| 3,101,736 | A | ‡ | 8/1963 | Egger ...................... | F16K 3/03 137/242 |
| 4,202,527 | A | ‡ | 5/1980 | Price ...................... | B04B 11/02 251/212 |
| 4,513,948 | A | ‡ | 4/1985 | Konig ....................... | F16K 3/03 251/212 |
| 5,806,725 | A | ‡ | 9/1998 | Bennett .................... | A21C 9/04 137/624.13 |
| 6,375,155 | B1 | ‡ | 4/2002 | Janssens ................. | F16L 55/10 251/212 |
| 6,666,237 | B2 | ‡ | 12/2003 | De Antoni Migliorati ................. | B65B 39/005 141/286 |
| 7,255,012 | B2 | ‡ | 8/2007 | Hedtke ..................... | F16K 3/03 73/861.61 |
| 7,819,728 | B2 | ‡ | 10/2010 | Beckley ................. | B60N 3/106 454/155 |
| 8,316,820 | B1 | ‡ | 11/2012 | Cammarata ............... | F16K 3/03 123/336 |

(Continued)

FOREIGN PATENT DOCUMENTS

GB          579471 A  ‡  8/1946

OTHER PUBLICATIONS

Egger Pumps and Valves Overview, pp. 1-47.‡

*Primary Examiner* — John Bastianelli
(74) *Attorney, Agent, or Firm* — Kearney, McWilliams & Davis, PLLC; Dileep P. Rao

(57) ABSTRACT

An iris-type diaphragm having a rear housing, a front plate, a plurality of iris blades, and a drive iris blade. The plurality of iris blades can be situated in substantially the same plane, with the iris blades being actuatable to adjust an aperture size. The drive iris blade can be in mechanical communication with an actuator and the plurality of iris blades. As the actuator displaces the drive iris blade, the drive iris blade in turn displaces the plurality of iris blades. Adjustable positioning of the iris-type diaphragm effectively tunes fluid harmonics and adjusts the signal to noise ratio, thus producing a more desirable fluid flow profile or signature.

10 Claims, 5 Drawing Sheets

(56) References Cited

U.S. PATENT DOCUMENTS

| | | | | |
|---|---|---|---|---|
| 8,430,140 | B2 ‡ | 4/2013 | Ognjanovski | B60K 15/0406 141/350 |
| 8,910,920 | B1 ‡ | 12/2014 | Daniels | F16K 31/535 251/212 |
| 10,076,619 | B2 ‡ | 9/2018 | Sears | A61M 16/20 |
| 2014/0124061 | A1 ‡ | 5/2014 | Daniels | F16K 3/03 137/505 |
| 2015/0041695 | A1 ‡ | 2/2015 | Daniels | F16K 31/53 251/212 |
| 2016/0074618 | A1 ‡ | 3/2016 | Foote | A61M 16/0003 128/204.23 |
| 2017/0292616 | A1 ‡ | 10/2017 | Moens | F16K 3/03 |

‡ imported from a related application

MONOPLANAR IRIS DIAPHRAGM

CROSS REFERENCE TO RELATED APPLICATIONS

The present application is a Continuation in Part and claims priority to and the benefit of co-pending U.S. patent application Ser. No. 16/527,403 filed on Jul. 13, 2019, titled "MONOPLANAR IRIS DIAPHRAGM". This reference is incorporated herein in its entirety.

FIELD

The present disclosure generally relates to an iris-type diaphragm.

BACKGROUND

Various devices are used in industry to regulate the flow of material. A typical example is a valve used to regulate fluid flow.

Any such fitting attached to a pipe causes turbulence in the flow of material within. This flow can be minimized by conforming the size and shape of the fitting to the pipe. Many pipe fittings, such as valves, orifices, and the like that are currently used have sharp features that result in turbulent fluid flow and undesirable pressure drop across the fitting.

Turbulence within the flowing fluid can induce unfavorable harmonics in the flowing conduit. Adjustable positioning of a diaphragm can effectively tune the fluid harmonics to a more favorable signal to noise ratio, thus producing a more desirable fluid flow profile or signature.

The present disclosure provides an iris-type diaphragm that better conforms to a pipe diameter and shape than currently used devices. Further the iris-type diaphragm allows for fine adjustments while maintaining the flow opening in a perfectly concentric position and a visible indication of opening size external to the diaphragm.

BRIEF DESCRIPTION OF THE DRAWINGS

The detailed description will be better understood in conjunction with the accompanying drawings as follows.

Figure 1:
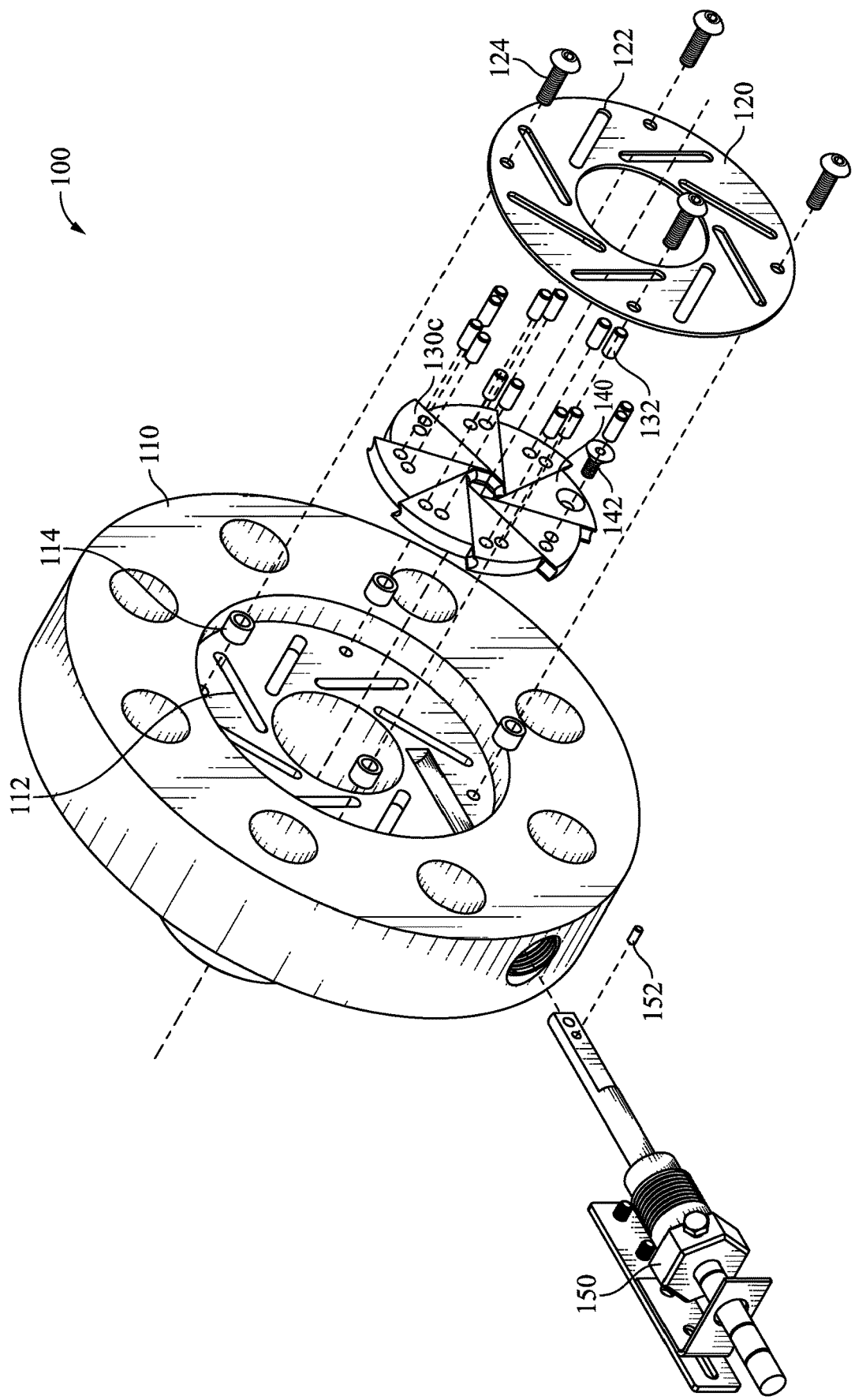
FIG. 1 depicts an exploded view of an embodiment of an iris-type diaphragm according to the present disclosure with a linear actuator.

The embodiments of the present disclosure are detailed below with reference to the listed Figures.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The word "about", when referring to values, means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The embodiments of the present disclosure generally relate to an iris-type diaphragm.

The iris-type diaphragm can have a rear housing, a front plate, a plurality of iris blades, and a drive iris blade.

The plurality of iris blades can be situated in substantially the same plane, with the iris blades being actuatable to adjust an aperture size. A drive iris blade can be in mechanical communication with an actuator and the plurality of iris blades. As the actuator displaces the drive iris blade, the drive iris blade in turn displaces the plurality of iris blades.

The iris blades can be substantially triangular in shape, such that the "peaks" of the triangles meet at a center to close or narrow the aperture defined by the iris blades. In embodiments, the "base" of the triangle can be rounded to create a pie shaped iris blade, such that all the blades define a circular shape when closed. In embodiments, there can be from four to ten iris blades. The number of blades can be determined by persons having ordinary skill in the art depending on the specific application and the diameter of the diaphragm.

In embodiments, each iris blade can comprise at least one slot. The slot can be on a side of the iris blade, to allow for a tongue in groove type of orientation to an adjacent iris blade (i.e., each iris blade comprises an indentation on a side of the iris blade and a protrusion on another side of the iris blade).

The rear housing can comprise a plurality of rear guide slots and an actuator cavity. The iris blades can comprise one or more rear protrusions to be received within each of the rear guide slots. These rear protrusions and rear guide slots can, together, act to constrain the movement of the iris blades to a linear path, as well as prevent the iris blades from rotating.

The front plate can be fastened to the rear housing and can comprise a plurality of front guide slots. The iris blades can comprise one or more front protrusions to be received within each of the front guide slots. These front protrusions and front guide slots can, together, act to constrain the movement of the iris blades to a linear path, as well as prevent the iris blades from rotating. Any fastener known to persons having ordinary skill in the art can be used to attach the front plate to the rear housing. Standoffs can be utilized to keep the face of the front plate substantially parallel to the face of the rear housing.

In embodiments, a flow opening of the front plate can be sized to be the full bore of a pipe to which the iris-type diaphragm is attached. This can not only allow for free fluid flow through the pipe with minimal turbulence, but also allow for cleaning (or pigging) of the pipe without disassembly of the fitting.

Together, the front plate and the rear housing act to stabilize the iris blades and constrain them substantially to a single plane. The motion of the iris blades is limited to a linear movement with substantially no rotation.

Turning now to the Figures, FIG. 1 depicts an exploded view of an embodiment of an iris-type diaphragm 100 according to the present disclosure with a linear actuator.

Shown here are rear housing 110, front plate 120, iris blades 130c, drive iris blade 140, and linear actuator 150.

Rear housing 110 can have rear guide slots 112 to receive a protrusion from the iris blade 130c. Front plate 120 can have front guide slots 122 to receive a protrusion from the iris blade 130c. Standoffs 114 can be used to properly position the front plate 120 with respect to the rear housing 110. Front plate 120 can be attached to rear housing 110 with a fastener 124.

Drive iris blade 140 can be in mechanical communication with the iris blades 130c, and drive iris blade 140 can be attached to the linear actuator 150 with a fastener 142. Anti-rotational protrusion 152 can also fit within a slot (not shown) on the drive iris blade 140 to prevent rotation of the drive iris blade 140. Dowel pins 132 can be used in embodiments to act as both the front and rear protrusions of the iris blades 130c.

Figure 2:
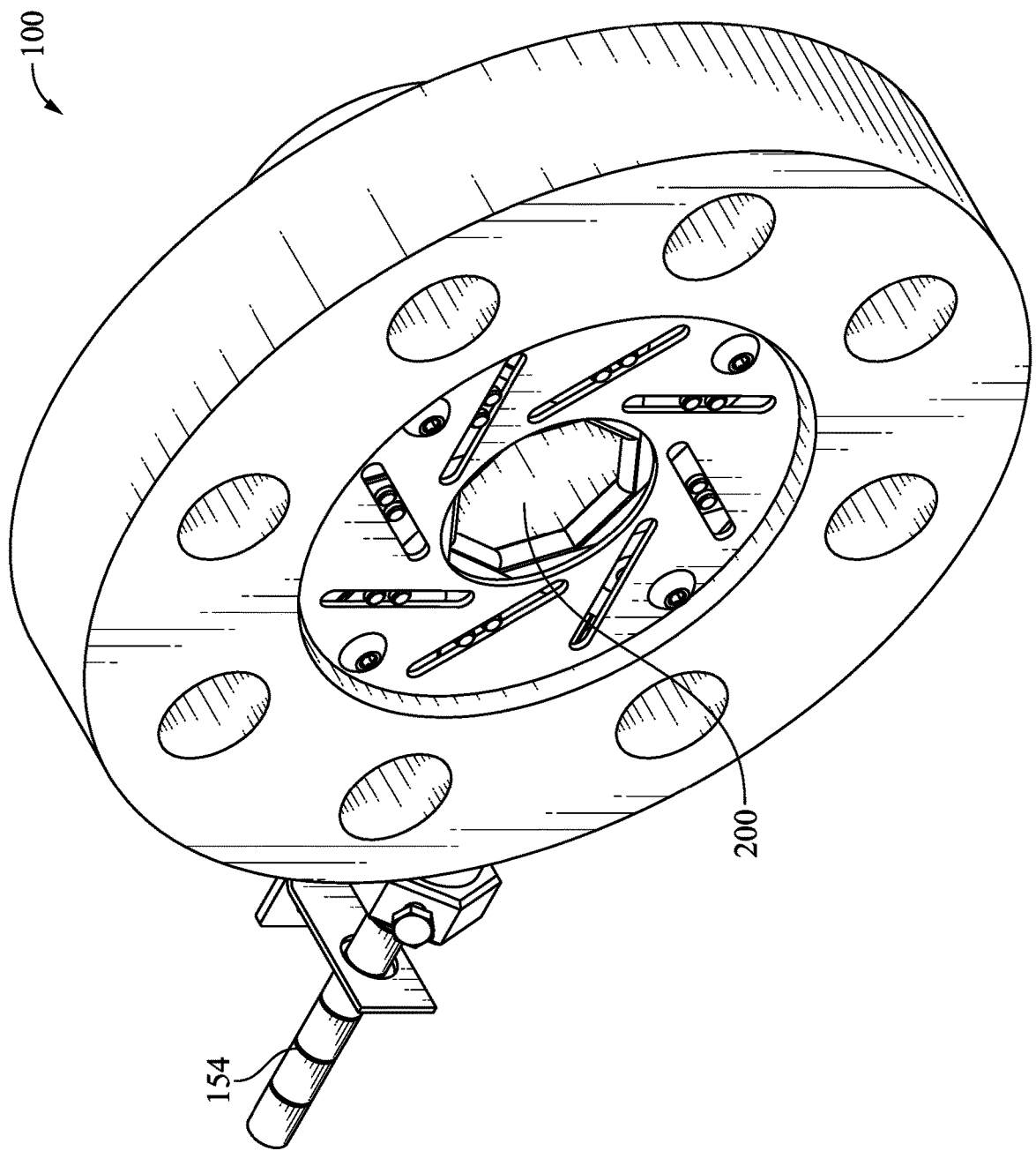
FIG. 2 depicts a perspective view of an embodiment of an iris-type diaphragm according to the present disclosure.

FIG. 2 depicts a perspective view of an embodiment of an iris-type diaphragm 100 according to the present disclosure.

The linear actuator can comprise markings 154 which show the position of the actuator, and therefore the drive iris blade. The markings 154 can indicate the size of the aperture 200 as defined by the iris blades.

Figure 3A:
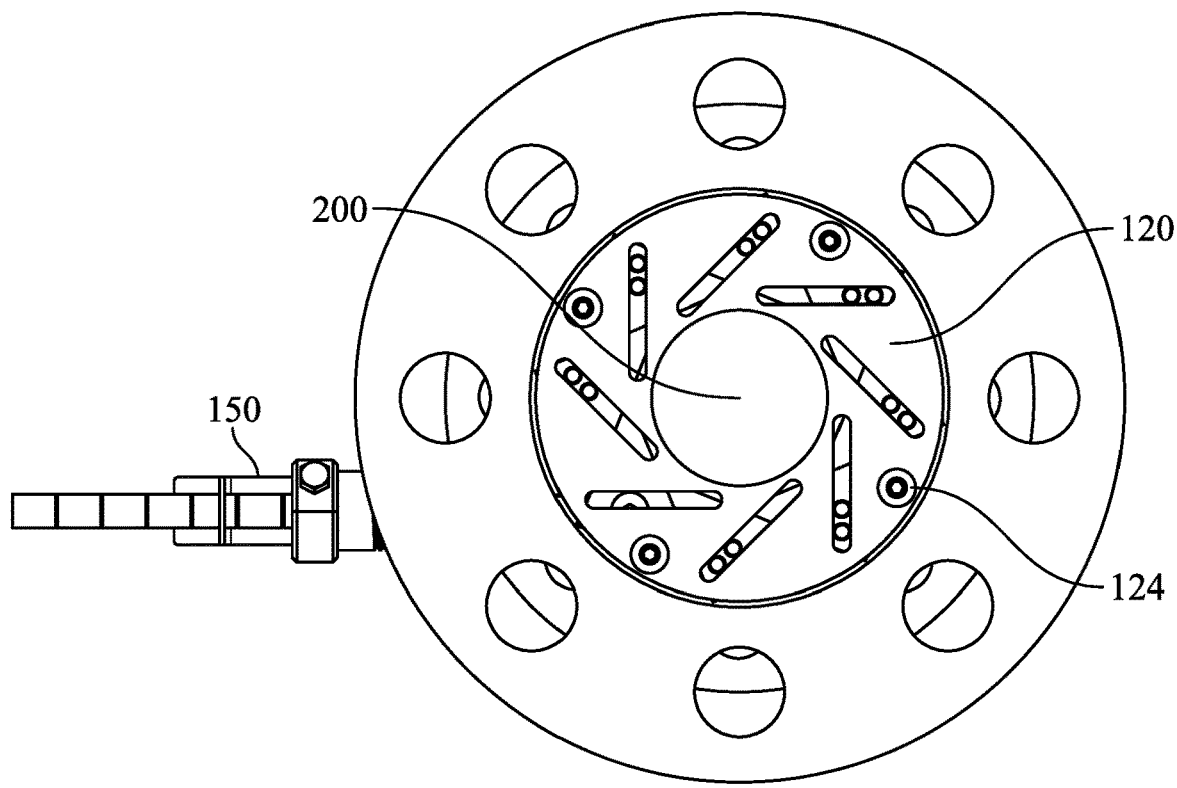
FIG. 3A depicts a front view of an embodiment of an iris-type diaphragm according to the present disclosure in an open position.

FIG. 3A depicts a front view of an embodiment of an iris-type diaphragm according to the present disclosure in an open position.

Note that fastener 124 maintains front plate 120 stationary with respect to the rear housing. Also, this serves to maintain the iris blades in a single plane and constrain their movement. Actuating the linear actuator 150 can adjust the size of aperture 200. Note that with aperture 200 in a fully opened position, the flow opening is perfectly circular to minimize turbulence.

Figure 3B:
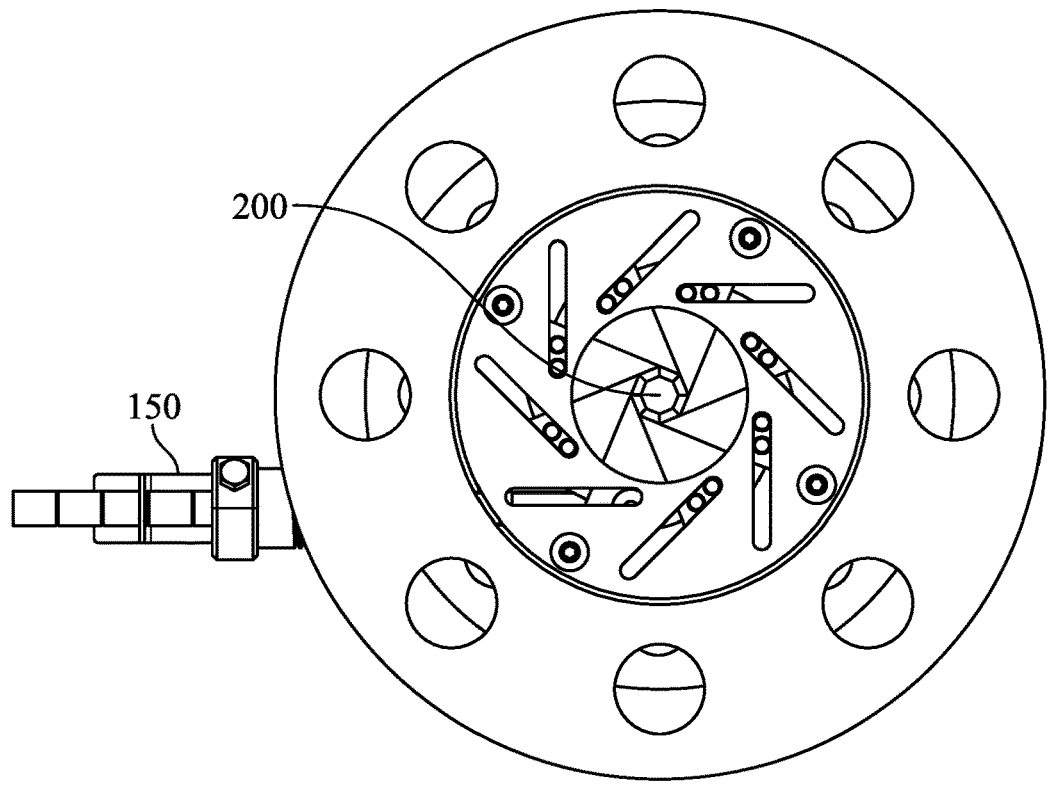
FIG. 3B depicts a front view of an embodiment of an iris-type diaphragm according to the present disclosure in a closed position.

FIG. 3B depicts a front view of an embodiment of an iris-type diaphragm according to the present disclosure in a closed position.

Actuating the linear actuator 150 can adjust the size of aperture 200. In the embodiment shown, the fully closed position still allows for a slight opening. Note that with aperture 200 in a fully closed position, the flow opening is still substantially circular to minimize turbulence. Further, the flow opening at any level of aperture 200 opening is perfectly concentric to the flow path. This further minimizes turbulence in fluid flowing through the iris-type diaphragm.

Figure 4A:
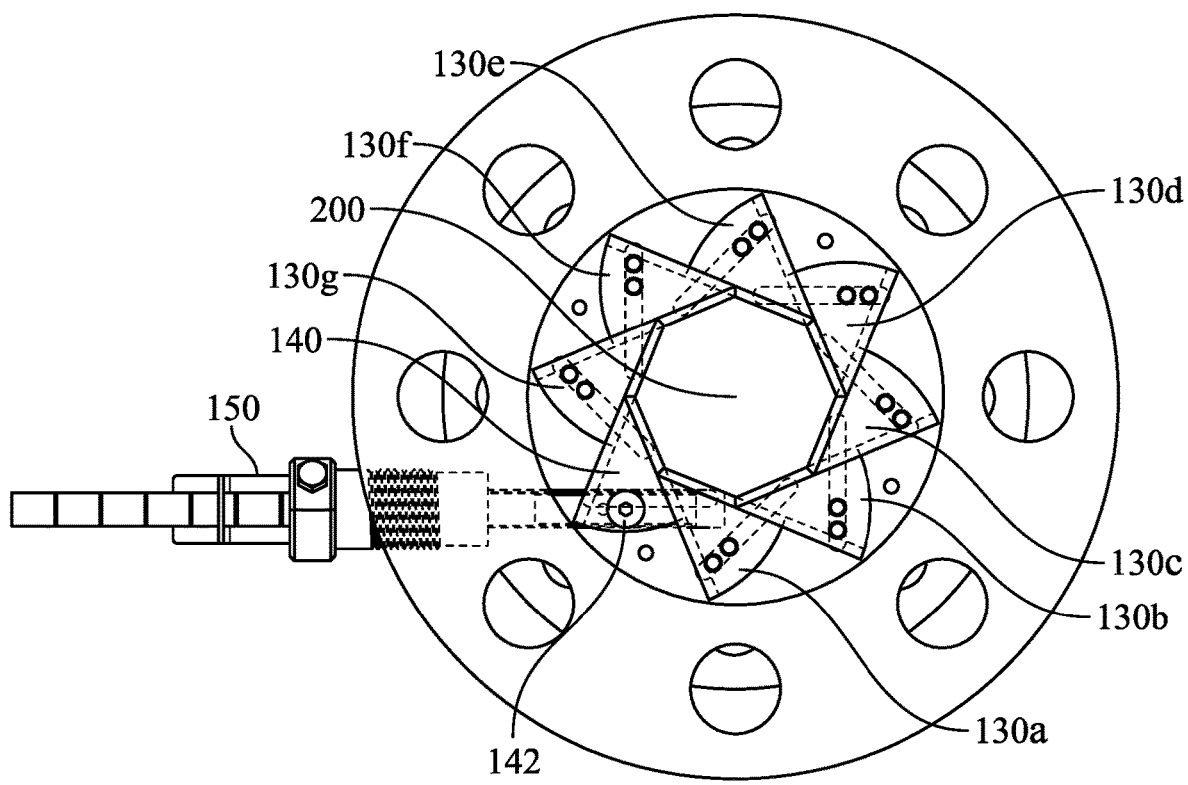
FIG. 4A depicts a front view of an embodiment of an iris-type diaphragm according to the present disclosure in an open position showing the position of the iris blades.

FIG. 4A depicts a front view of an embodiment of an iris-type diaphragm according to the present disclosure in an open position showing the position of the iris blades.

Figure 4B:
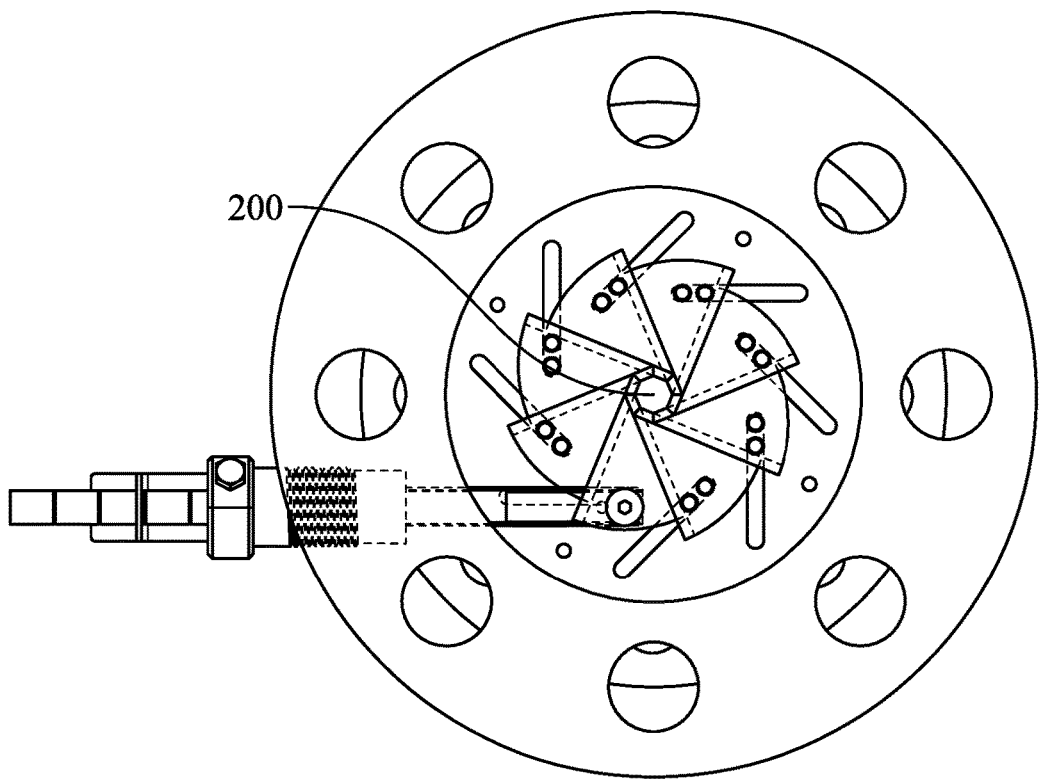
FIG. 4B depicts a front view of an embodiment of an iris-type diaphragm according to the present disclosure in a closed position showing the position of the iris blades.

FIG. 4B depicts a front view of an embodiment of an iris-type diaphragm according to the present disclosure in a closed position showing the position of the iris blades.

FIGS. 4a and 4B show the same view as FIGS. 3A and 3B respectively without the front plate. This is merely to illustrate the movement of the plurality of iris blades 130a-130g as driven by the drive iris blade 140 when impelled by the linear actuator 150. Aperture 200 can be adjusted concentric to the flow path.

Figure 5:
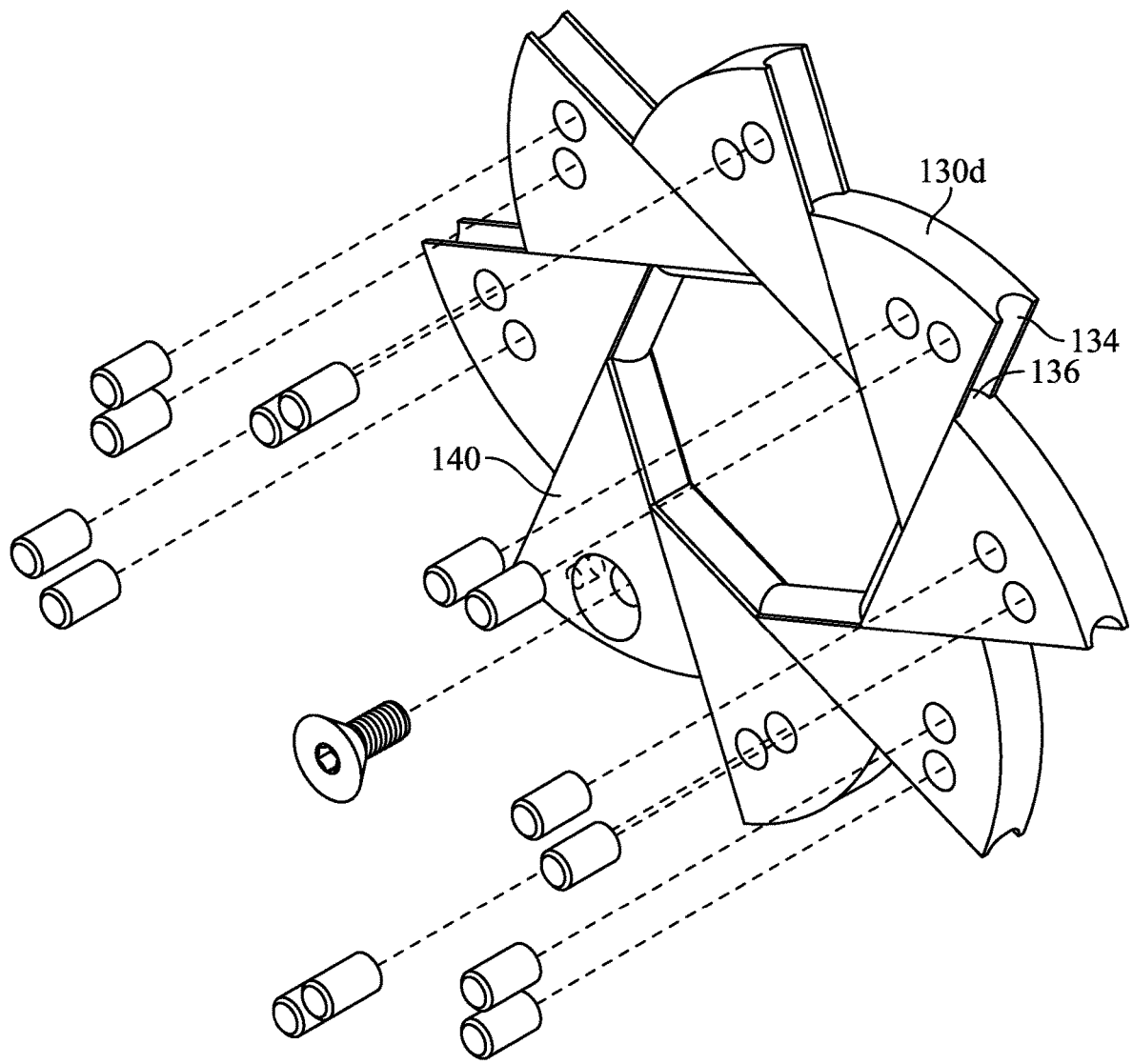
FIG. 5 depicts an exploded perspective view of an embodiment of the iris blades.

FIG. 5 depicts an exploded perspective view of an embodiment of the iris blades.

Shown here is slot 134 and protrusion 136, which allow the plurality of iris blades 130d to be in mechanical communication with one another in a tongue in groove orientation. Drive iris blade 140 can also have similar feature.

While the present disclosure emphasizes the presented embodiments and Figures, it should be understood that within the scope of the appended claims, the disclosure might be embodied other than as specifically enabled herein

What is claimed is:

1. An iris-type diaphragm comprising:
    a. a rear housing comprising a plurality of rear guide slots and an actuator cavity;
    b. a front plate comprising a plurality of front guide slots fastened to the rear housing;
    c. a plurality of iris blades disposed between the rear housing and the front plate, wherein each iris blade of the plurality of iris blades comprises:
        (i) a rear protrusion to be and slides along a rear guide slot of the plurality of rear guide slots; and
        (ii) a front protrusion to be and slides along a front guide slot of the plurality of front guide slots; and
    d. a drive iris blade disposed between the rear housing and the front plate, wherein the drive iris blade is in mechanical communication with the plurality of iris blades; and
    e. a linear actuator, directly fastened to the drive iris blade, wherein at least a portion of the linear actuator is received within the actuator cavity.

2. The iris-type diaphragm of claim 1, further comprising at least one standoff between the rear housing and the front plate.

3. The iris-type diaphragm of claim 1, further comprising an anti-rotational protrusion on the drive iris blade.

4. The iris-type diaphragm of claim 3, further comprising an anti-rotational slot on the linear actuator for receiving the anti-rotational protrusion.

5. The iris-type diaphragm of claim 1, wherein each iris blade of the plurality of iris blades comprises at least two rear protrusions and at least two front protrusions.

6. The iris-type diaphragm of claim 1, wherein each iris blade of the plurality of iris blades is substantially triangular.

7. The iris-type diaphragm of claim 1, wherein each iris blade of the plurality of iris blades is configured to seal against an adjacent iris blade.

8. The iris-type diaphragm of claim 1, wherein each iris blade of the plurality of iris blades is configured to seal against an adjacent iris blade, and further wherein each iris blade is configured to contact an adjacent iris blade in a tongue in groove configuration.

9. The iris-type diaphragm of claim 1, wherein each iris blade of the plurality of iris blades comprises an indentation on a side of the iris blade and a protrusion on another side of the iris blade.

10. The iris-type diaphragm of claim 1, wherein the plurality of iris blades are in a single plane.

\* \* \* \* \*